United States Patent

Caveney et al.

[15] 3,659,117

[45] Apr. 25, 1972

[54] TRACK AND HOLD APPARATUS

[72] Inventors: Robert D. Caveney; Ronnie M. Harrison, both of San Jose, Calif.

[73] Assignee: American Astrionics, Inc., Palo Alto, Calif.

[22] Filed: Oct. 6, 1970

[21] Appl. No.: 78,356

[52] U.S. Cl. ..............................307/238, 307/246, 307/257, 328/151

[51] Int. Cl. ..........................................................H03k 17/74

[58] Field of Search ..................328/151, 176; 307/238, 246, 307/257

[56] References Cited

UNITED STATES PATENTS

| | | | |
|---|---|---|---|
| 2,697,782 | 12/1954 | Lawson | 328/151 |
| 3,286,101 | 11/1966 | Simon | 328/151 |
| 3,480,795 | 11/1969 | Benson | 328/151 |
| 2,897,358 | 7/1959 | Casey | 328/176 |

*Primary Examiner*—Donald D. Forrer
*Assistant Examiner*—Harold A. Dixon
*Attorney*—Flehr, Hohbach, Test, Albritton & Herbert

[57] ABSTRACT

Track and hold apparatus for sampling a video analog input signal including input buffer means having a constant power dissipation for a varying input signal and including a diode switching bridge coupled to a holding capacitor which is switched off at a common level by turn off clamps whose turn off level is varied by the stored amplitude level of the holding capacitor.

4 Claims, 6 Drawing Figures

INVENTORS
ROBERT D. CAVENEY
RONNIE M. HARRISON
BY Flehr, Hohbach, Test, Albritton & Herbert
ATTORNEYS INVENTORS
ROBERT D. CAVENEY
RONNIE M. HARRISON
BY Flehr, Hohbach, Test, Albritton & Herbert
ATTORNEYS

TRACK AND HOLD APPARATUS

BACKGROUND OF THE INVENTION

The present invention is directed to a track and hold apparatus for sampling an analog signal.

In a track and hold circuit, especially one used to sample an input video signal, the high speed and accuracy required in the overall system is usually limited by the performance of the track and hold apparatus. For example, settling time must be allowed, jitter prevented and the effects of temperature must be taken into account. Moreover, since sampling is taking place the circuit has an inherent limitation in that sampling requires switching or a change of impedance condition which has a tendency to produce jitter or alternatively increase the settling time by producing a ringing effect. Also an increase in circuit noise may occur because of the change of impedance on the input circuit.

Thus, it is desirable to minimize the effects of the sampling operation on the input circuit and to make the sampling operation itself as accurate and fast as possible.

OBJECTS AND SUMMARY OF THE INVENTION

It is, therefore, a general object of the present invention to provide an improved track and hold apparatus for sampling an analog signal.

It is another object of the invention to provide apparatus as above which is accurate and has a high speed capability.

In accordance with the above objects there is provided track and hold apparatus for sampling an analog signal. This apparatus includes buffer means having an input terminal with a relatively high impedance coupled to the analog signal and an output terminal with a relatively low output impedance. The buffer means has a substantially constant power dissipation with varying amplitudes of the analog signal. Storage means are provided. Switching means are provided for coupling the output terminal of the buffer means to the storage means. The switching means have a low impedance condition when tracking the amplitude of the analog signal and a high impedance condition when the storage means holds the most recent tracked amplitude. Means are included for causing the switching means to switch from one condition to another.

DETAILED DESCRIPTION OF THE PREFERRED EMBODIMENT

Figure 1:
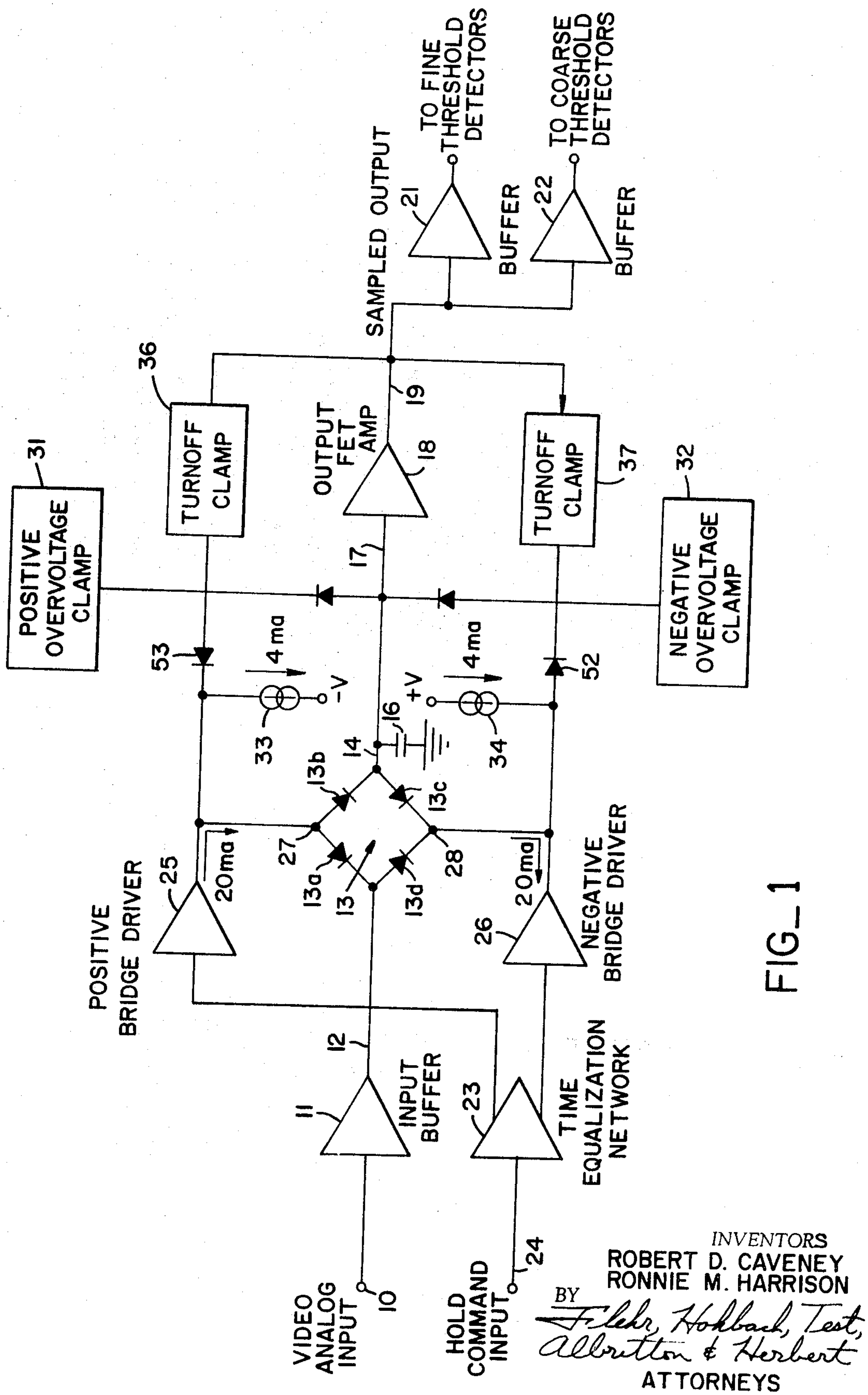
FIG. 1 is an overall block diagram of track and hold apparatus embodying the present invention.

Referring first to FIG. 1, a video analog input signal is applied to an input terminal 10 of an input buffer 11 which on an output line 12 couples a signal to a switch or bridge 13 consisting of four diodes 13a through 13d. The output 14 of the bridge is coupled to a storage means or capacitor 16. The stored voltage of capacitor 16 is coupled to the input 17 of an output buffer 18 in the form of a field effect transistor amplifier. The output line 19 of the FET amplifier thus provides the sample amplitude of the video analog input signal at terminal 10.

This is applied through a first output buffer 21 and a second output buffer 22 to both fine threshold detectors and coarse threshold detectors to convert the analog signal to digital format. Buffers 21 and 22 are similar in construction to input buffer 11. Such analog to digital conversion is disclosed and claimed in a copending application entitled "High Speed Analog To Digital Converter and Method Therefor" in the names of Fraschilla, Caveney, and Harrison, Ser. No. 876,787, filed Nov. 14, 1969, now U.S. Pat. No. 3,597,761.

The input buffer 11 provides isolation from the signal source circuits because of its high input impedance and its low output impedance provides high current capability for driving bridge 13 and hold capacitor 16. Diode bridge 13 provides a very low impedance charging path to capacitor 16 in the "track" mode where the video analog input signal 10 is being coupled to hold capacitor 16 which is being charged with a voltage which is the present amplitude of that input signal. In the "hold" mode where the most recently tracked amplitude is being held in capacitor 16, bridge 13 is biased off and thus presents a relatively high impedance.

Means for causing the switching of bridge 13 includes a time equalization network 23 which is driven from hold command input line 24. Network 23 in turn drives the positive bridge driver 25 and a negative bridge driver 26, which are respectively coupled to the drive corners 27 and 28 of the bridge to assure that both drivers function simultaneously.

Voltages on buffer input line 17 are limited by a positive overvoltage clamp 31 and a negative overvoltage clamp 32.

Normally in the hold condition both the positive and negative bridge drivers 25 and 26 are switched off and the bridge is biased off by the 4ma current sources 33, 34 coupled respectively to driving points 27 and 28. Sampling occurs when the hold command input goes false to activate the bridge drivers 25 and 26 which provide currents respectively in opposition to current sources 33 and 34 and of a greater magnitude such as 20ma. These turn the bridge on and the bridge remains unbalanced until the output voltage on line 14 equals the input voltage on line 12. Capacitor 17 is supplied current during this unbalanced condition by the bridge drive amplifiers 25 and 26. When the output voltage equals the input voltage no net current will flow in or out of the input buffer 11 or the hold capacitor and all the bridge drive current flows through the bridge. The voltage on the hold capacitor will track the input voltage until the bridge drive is removed.

Figures 2A, 2B, 3:
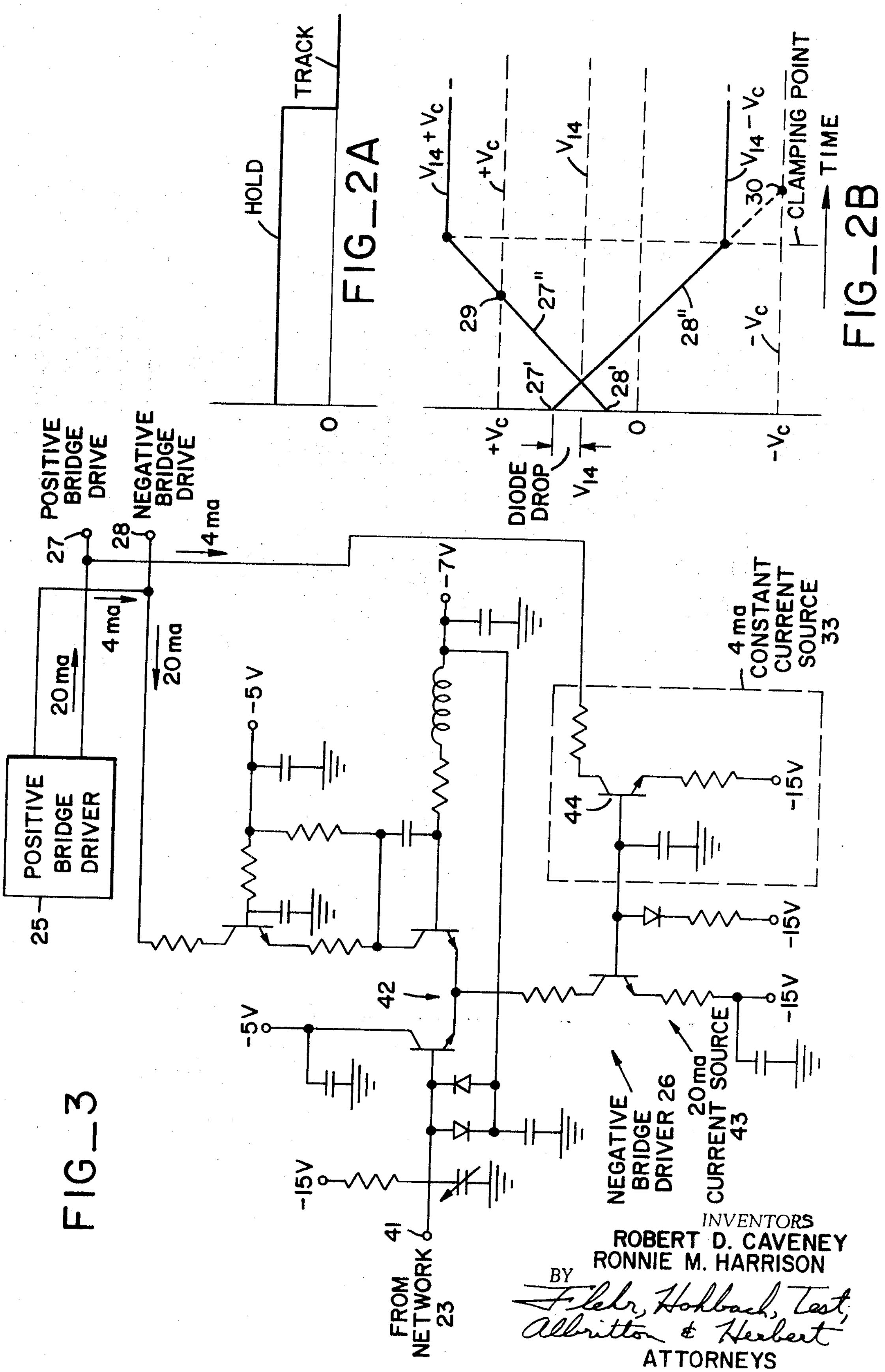
FIGS. 2A and 2B are timing diagrams and characteristic waveforms useful in understanding the present invention.
FIG. 3 is a detailed circuit schematic of another portion of FIG. 1.

When a hold command (FIG. 2A) is initially received on input line 24, the positive and negative drive corners 27, 28 of bridge 13 will be at the voltage indicated in FIG. 2B as 27', 28'. This is the same voltage, $V_{14}$, held by the holding capacitor 16 minus the diode voltage drop of the bridge.

The hold command causes a cessation of the drive currents of bridge drivers 25 and 26. The remaining negative current from current sources 33 and 34 cause the corners of the bridge to become reversed biased at the constant rate shown by the lines 27'' and 28'' (FIG. 2B). The capacitances at the bridge corners have been made equal.

Turnoff clamps 36 and 37, which will be described in greater detail below, provide positive and negative clamp voltages which are symmetrical with respect to the signal amplitude, $V_{14}$, held by holding capacitor 16. This insures that both corners of the bridge will cease slewing at the same time, designated "clamping point" in FIG. 2B. As shown, the clamp voltages are $V_{14}+V_c$ and $V_{14}-V_c$.

Without the above modification the use of fixed and equal clamp voltages would cause one clamp to be activated before the other. See, for example, the time relationships of points 29 and 30 in FIG. 2. This would cause undesirable transients and subsequent ringing which would feed through to the hold capacitor 16 during turnoff.

FIG. 3 illustrates in more detailed form the negative bridge driver 26 and the accompanying 4ma constant current source 33 which is associated with driving point 27. A proper command from the network 23 to the input 41 of the negative bridge driver 26 switches the differential amplifier 42 to allow a 20ma current from the current source 43 to sink the 20ma of current from the negative bridge drive point 28. For circuit convenience constant current source 33 also includes the transistor 44 which is physically present in the same circuit. It is also a current sink in application. Similarly, the positive bridge drive circuit 25 includes a 4ma current source 34 (FIG. 1) which normally biases drive terminal 28.

Figures 4, 4A:
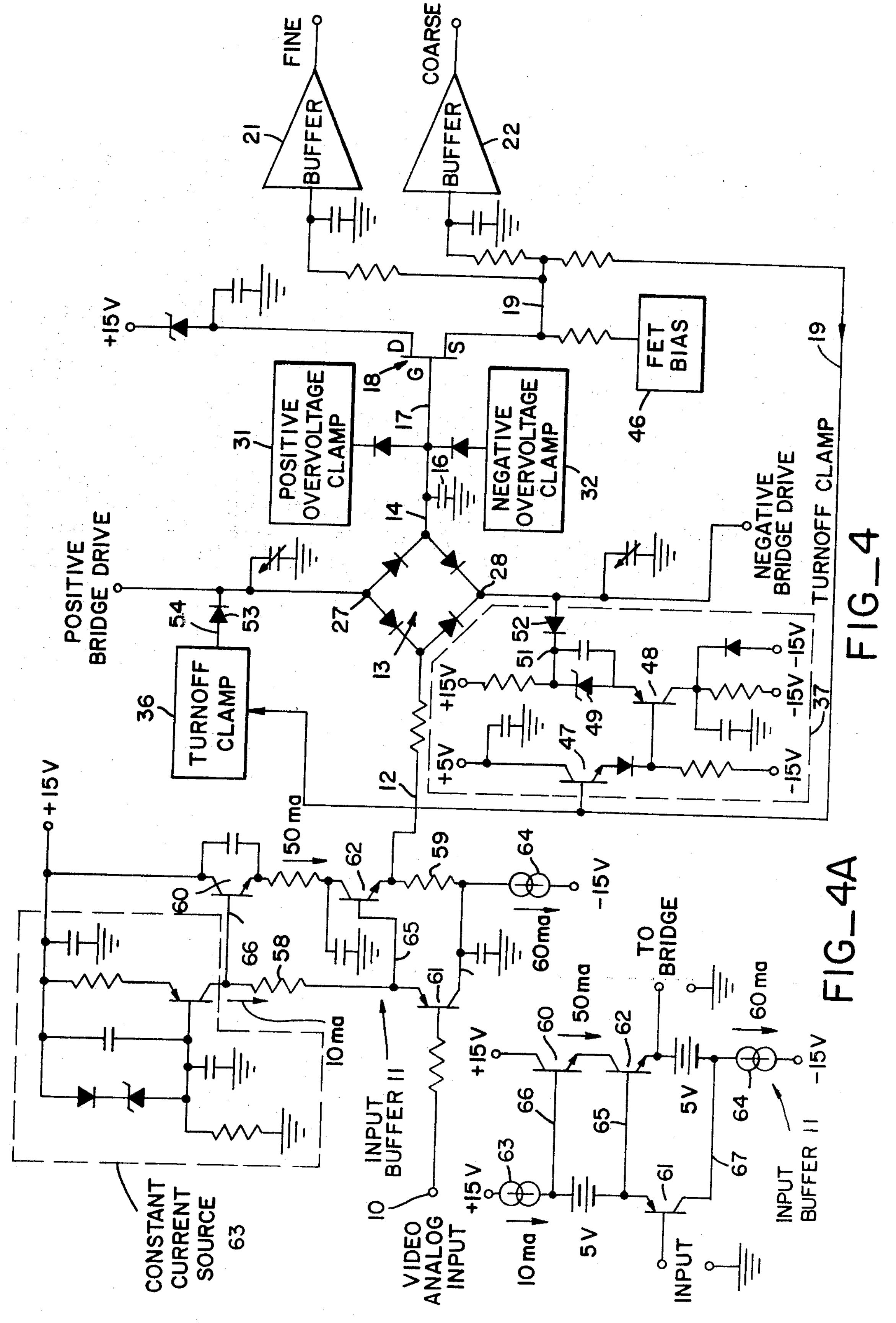
FIG. 4 is a more detailed circuit schematic of FIG. 1
FIG. 4A is a simplified circuit schematic of a portion of FIG. 4.

The turnoff clamp 37 is more clearly shown in FIG. 4 driven by a feedback line 19 from the output of the FET amplifier 18. The amplifier also includes a bias source 46 coupled to its source terminal. Feedback line 19 is coupled to the input transistor 47 of turnoff clamp 37 connected as an emitter follower which is cascaded with a transistor 48 whose emitter output is coupled through 5 volt Zener diode 49 to a clamping point indicated as 51. Clamping point 51 is coupled to drive point terminal 28 through a diode 52.

The upper turnoff clamp 36 also has a substantially identical circuit but with a diode 53 which is connected in opposite polarity relative to diode 52. The diode clamping points at 51 and the equivalent point 54 are referenced to the track and hold output of line 19 through the 5 volt Zener diode 49 and the isolating emitter followers 47 and 48. These emitter followers also eliminate any signal feedthrough from the bridge and input circuit during the hold mode. Again, FIG. 2B illustrates the symmetrical clamping levels provided at points 51 and 54. These levels will, of course, vary in accordance with the held voltage on line 19.

Input buffer 11 is illustrated in FIG. 4A in a generalized simplified format and includes emitter follower connected transistors 61 and 62, 61 being the input transistor and 62 the output transistor. These operate with a constant power dissipation by biasing them with constant emitter currents; specifically a 10ma current source 63 coupled through a 5 volt constant potential to the emitter of transistor 61 and a 60ma constant current source 64 coupled through a second 5 volt constant potential to the emitter of transistor 62. Current source 64 serves as a sink and 63 as a source. Thus, there is a 50ma current flowing through the cascaded output transistors 62 and 60. Transistor 60, of course, is for the purpose of providing this 50ma current. However, in addition transistor 60 is in effect a variable impedance element which is varied by the analog voltage at the analog voltage at the base input of transistor 61. Transistors 61 and 62, of course, are of opposite polarity types. The collectors of these two transistors are bootstrapped to maintain a constant voltage from emitter to collector. Specifically, the output at the emitter of transistor 62 is shifted in level by 5 volts and that voltage is applied to the collector of transistor 61. Similarly, the emitter output of transistor 61 is shifted by 5 volts and this voltage is applied to the collector of transistor 62 through transistor 60 which acts as an emitter follower also.

Thus, for example, if the signal level at the input of transistor 61 is increased by 1 volt, this will cause a 1 volt increase on line 65 to the base input of transistor 62, the base input on line 66 to transistor 60, the collector and emitter of transistor 62 and on the bootstrapping line 67 connecting the emitter of transistor 62 to the collector of transistor 61. By use of the current sources 63 and 64 the entire buffer circuit floats in accordance with the input voltage. Thus, a constant voltage is maintained from the emitter to collector of transistors 61 and 62 to provide for a constant power dissipation and thus temperature stability.

FIG. 4 shows the buffer circuit in detail along with the constant current source 63 which supplies a 10ma current. The 5 volt level shift at the emitter of transistor 61 is provided by a resistor 58 and the 10ma current across it. Similarly, the 5 volt level shift at the emitter of transistor 62 is provided by a series resistor 59 and the 50ma current across it.

Thus, the buffer provides a low output impedance with a fixed high input impedance which immunizes the impedance changes of bridge 13 from the analog voltage source. This is also achieved with temperature stability because of the constant power dissipation of the buffer 11.

Thus, the present invention provides an improved track and hold apparatus with improved accuracy and speed.

We claim:

1. Track and hold apparatus for sampling an analog signal comprising: buffer means having an input terminal with a relatively high impedance for being coupled to said analog signal and an output terminal with a relatively low output impedance said buffer means having a substantially constant power dissipation with varying amplitudes of said analog signal said buffer means comprising first and second complementary transistors connected as emitter followers, means for biasing said two transistors with constant current sources coupled respectively to the emitters of said transistors, and means for bootstrapping the collectors of said two transistors by respectively coupling the emitter of one transistor to the collector of the other to maintain a constant voltage between the emitter and collector of each transistor with varying input signal; storage means; switching means for coupling said output terminal of said buffer means to said storage means; said switching means having a low impedance condition when said storage means tracks the amplitude of said analog signal and a high impedance condition where said storage means holds the most recently tracked amplitude; and means for causing said switching means to switch from one condition to another.

2. Apparatus as in claim 1 where said constant current means allows said transistors to float relative to ground.

3. Apparatus as in claim 2 where one of the transistors is an output transistor and the other an input transistor the output transistor having an additional emitter follower connected transistor coupled to its collector such additional transistor having a base input coupled to the emitter of the input transistor, said additional transistor serving as a variable impedance responsive to said analog input voltage to change the output voltage at the emitter of said output transistor.

4. Track and hold apparatus for sampling an analog signal comprising: buffer means having an input terminal with a relatively high impedance for being coupled to said analog signal and an output terminal with a relatively low output impedance; storage means; switching means for coupling said output terminal of said buffer means to said storage means; said switching means having a low impedance condition where said storage means tracks the amplitude of said analog signal and a high impedance condition when said storage means holds the most recently tracked amplitude said switching means including a bridge circuit having positive and negative drive terminals, positive and negative driving means for biasing said bridge circuit either in said high impedance or low impedance condition, and turnoff clamping means responsive to the signal amplitude held by said storage means and coupled to both said positive and negative drive terminals of said bridge for providing positive and negative clamping points when said bridge is changing from its low impedance to its high impedance condition said clamping points being symmetrical with respect to said signal amplitude.

* * * * *